US009688286B2

(12) United States Patent
Wilkes, III et al.

(10) Patent No.: US 9,688,286 B2
(45) Date of Patent: Jun. 27, 2017

(54) SYSTEM AND METHOD FOR INTEGRATING SMARTPHONE TECHNOLOGY INTO A SAFETY MANAGEMENT PLATFORM TO IMPROVE DRIVER SAFETY

(75) Inventors: Samuel M. Wilkes, III, Atlanta, GA (US); Michael N. Ferrara, Jr., Hillsborough, NJ (US); Richard J. Mahany, Whitefish Bay, WI (US); Peter J. Begley, Boston, MA (US)

(73) Assignee: Omnitracs, LLC, Dallas, TX (US)

( * ) Notice: Subject to any disclaimer, the term of this patent is extended or adjusted under 35 U.S.C. 154(b) by 1150 days.

(21) Appl. No.: 12/704,038

(22) Filed: Feb. 11, 2010

(65) Prior Publication Data

US 2011/0077028 A1 Mar. 31, 2011

Related U.S. Application Data

(60) Provisional application No. 61/246,767, filed on Sep. 29, 2009.

(51) Int. Cl.
*B60W 50/14* (2012.01)
*B60W 30/08* (2012.01)
(Continued)

(52) U.S. Cl.
CPC ............ *B60W 50/14* (2013.01); *B60W 30/08* (2013.01); *B60W 2050/0077* (2013.01);
(Continued)

(58) Field of Classification Search
CPC .......... B60R 2021/0027; B60R 21/013; B60R 21/0132; B60R 2001/1223;
(Continued)

(56) References Cited

U.S. PATENT DOCUMENTS

| | | | | |
|---|---|---|---|---|
| 6,575,902 | B1 * | 6/2003 | Burton | 600/300 |
| 6,856,906 | B2 * | 2/2005 | Winner et al. | 701/301 |

(Continued)

FOREIGN PATENT DOCUMENTS

| | | | |
|---|---|---|---|
| JP | 2009175871 | * | 8/2009 |
| WO | WO 2009/000743 A1 | | 12/2008 |

OTHER PUBLICATIONS

International Search Report and Written Opinion—PCT/US2010/045892, International Search Authority—European Patent Office—Nov. 8, 2010.

(Continued)

*Primary Examiner* — Sujatha Sharma
(74) *Attorney, Agent, or Firm* — Arent Fox LLP

(57) ABSTRACT

Identifying risky driving situations in the context of a driver's real-time operating environment and providing effective interventions and countermeasures that mitigate the risky situation to reduce the likelihood of the driver having a vehicular accident. A driver monitoring and mentoring system includes mobile safety centers individually installed on driver-assigned smartphones or other mobile devices. The mobile safety centers collect real-time driving data and compute a risk of a driver in a specific situation being involved in an accident and provide mentoring to drivers in a driver risk situation above a risk threshold to reduce the likelihood of an accident. The mobile safety centers communicate with a master safety analytics center that collects data, collects and stores information relating to detected risk situations, creates risk algorithms, creates driving mentoring communications, and communicates the algorithms and communications to the mobile safety centers.

51 Claims, 5 Drawing Sheets

(51) Int. Cl.
*H04M 1/60* (2006.01)
*B60W 50/00* (2006.01)

(52) U.S. Cl.
CPC ..... *B60W 2540/28* (2013.01); *B60W 2550/12* (2013.01); *B60W 2550/20* (2013.01); *B60W 2550/22* (2013.01); *B60W 2550/402* (2013.01); *H04M 1/6075* (2013.01)

(58) Field of Classification Search
CPC .......... B60R 2021/01315; B60N 2/002; B60N 2002/0268; B60N 2002/0272; B60N 2/015; B60N 2/0232; B60N 2/0244; B60N 2/0248; B60N 2/0252; B60N 2/0276; B60N 2/067
USPC ......... 455/456.1, 426.1, 410, 344, 345, 352, 455/556.1, 404.1, 450, 67.11, 423, 414.1, 455/41.2; 340/441, 438, 439, 435, 436, 340/901, 961, 936, 905; 701/93, 117, 701/213, 201, 211, 301, 32, 216, 217
See application file for complete search history.

(56) References Cited

U.S. PATENT DOCUMENTS

| | | | | |
|---|---|---|---|---|
| 7,313,759 | B2 | 12/2007 | Sinisi | |
| 7,349,782 | B2 | 3/2008 | Churchill et al. | |
| 8,095,313 | B1 * | 1/2012 | Blackburn | 701/301 |
| 8,155,853 | B2 * | 4/2012 | Wang | 701/70 |
| 2002/0151297 | A1 * | 10/2002 | Remboski et al. | 455/414 |
| 2003/0120589 | A1 * | 6/2003 | Williams | G06Q 10/0635 705/38 |
| 2003/0143957 | A1 * | 7/2003 | Lyon | 455/67.1 |
| 2005/0182539 | A1 * | 8/2005 | Maass | 701/41 |
| 2005/0264404 | A1 | 12/2005 | Franczyk et al. | |
| 2006/0052929 | A1 * | 3/2006 | Bastian | B60K 28/06 701/93 |
| 2006/0103513 | A1 | 5/2006 | Ihara et al. | |
| 2006/0181433 | A1 * | 8/2006 | Wolterman | G08G 1/164 340/917 |
| 2006/0220908 | A1 * | 10/2006 | Petersen et al. | 340/903 |
| 2006/0220915 | A1 * | 10/2006 | Bauer | 340/945 |
| 2007/0087756 | A1 * | 4/2007 | Hoffberg | 455/450 |
| 2007/0198190 | A1 | 8/2007 | Bauer et al. | |
| 2008/0086492 | A1 | 4/2008 | Maeda | |
| 2008/0120025 | A1 | 5/2008 | Naitou et al. | |
| 2008/0125959 | A1 | 5/2008 | Doherty et al. | |
| 2008/0133136 | A1 | 6/2008 | Breed et al. | |
| 2008/0258890 | A1 | 10/2008 | Follmer et al. | |
| 2009/0079555 | A1 | 3/2009 | Aguirre De Carcer et al. | |
| 2009/0091435 | A1 * | 4/2009 | Bolourchi | B60K 28/066 340/435 |
| 2009/0171528 | A1 | 7/2009 | Golde et al. | |
| 2009/0215466 | A1 | 8/2009 | Ahl et al. | |
| 2010/0033333 | A1 * | 2/2010 | Victor et al. | 340/576 |
| 2010/0136944 | A1 * | 6/2010 | Taylor et al. | 455/404.1 |
| 2011/0010042 | A1 * | 1/2011 | Boulet | G08G 1/052 701/31.4 |
| 2011/0022298 | A1 * | 1/2011 | Kronberg | 701/200 |
| 2011/0130111 | A1 * | 6/2011 | Crandall et al. | 455/404.1 |

OTHER PUBLICATIONS

Mohan P et al., "Nericell: Rich Monitoring of Road and Traffic Conditions using Mobile Smartphones", Microsoft Research India, Bangalore, 14 pages.
Lu, Meng, "Exploring Enabling Technologies for Road Traffic Safety" Fisita World Automotive Congress, Jul. 3, 2004, pp. 1-13, Barcelona.
Ukkusuri, Satish, "Technical Memorandum 4: Shortlist of Emerging Technologies" A Comprehensive Survey of Emerging technologies for the New York Metropolitan Area, May 19, 2008, pp. 1-53.
Cardinal Search Report, Project 5109.9 Using Hand-Held Devices such as a Blackberry or iPhone to Support Traffic Safety, Sep. 21, 2009.
Canadian Office Action dated Feb. 12, 2014 issued in Canadian Patent Application No. 2,775,819.
Partial European Search Report dated Jun. 22, 2015 issued in European Patent Application No. 1082981.8.
Canadian Office Action dated Dec. 1, 2016 issued in Canadian Patent Application No. 2,923,924.

* cited by examiner

SYSTEM AND METHOD FOR INTEGRATING SMARTPHONE TECHNOLOGY INTO A SAFETY MANAGEMENT PLATFORM TO IMPROVE DRIVER SAFETY

RELATED APPLICATION

This non-provisional patent application claims priority under 35 U.S.C. §119 to U.S. Provisional Patent Application No. 61/246,767, entitled, "System and Method for Integrating Smartphone Technology Into a Safety Management Platform to Improve Driver Safety," filed Sep. 29, 2009, the complete disclosure of which is hereby fully incorporated herein by reference.

TECHNICAL FIELD

The invention relates generally to driver safety. More particularly, this invention relates to a driver safety management system that integrates features and functionality of a mobile device, such as a smartphone, into a comprehensive safety management platform for reducing motor vehicle accidents, violations, and associated costs along with capability to increase overall effectiveness of a driver safety program.

BACKGROUND

Special purpose safety devices have been installed in commercial and private vehicles to monitor risk situations while the vehicle is in operation and/or to provide mentoring to drivers with the goal of improving safe-driving and reducing accidents on public roadways. These special purpose safety devices employ a wide range of risk identification technologies, including optical systems (e.g., cameras and infrared), radio frequency ("RF") and acoustic systems (e.g., sonar), data recorders, accelerometers, and/or gyroscope-based measuring systems.

Most conventional special purpose safety devices are single risk specific. For example, some conventional special purpose safety devices monitor only speeding or monitor only lane position. These single-risk safety devices typically inform a driver of a non-compliance event, such as when one or more sensors indicate that a fixed risk threshold has been exceeded, using a simple audible or visual warning system, such as a light or beeping sound, without taking into consideration other risk factors, such as traffic, road conditions, driver fatigue level, or risk history. Thus, the conventional single-risk safety devices are simply a warning system for alerting a driver at a point in time of a specific non-compliance event.

Other conventional single-risk special purpose safety devices use a camera to record the driver and the surrounding environment. Similar to the above described single-risk safety devices, the camera-based safety device is limited to monitoring a single non-compliance event only. When the single non-compliance event is detected, the camera-based safety device records the event. However, the camera-based safety devices do not warn the driver at the time of the non-compliance event. Instead, video and data are collected and reviewed by a driver sponsor, such as a parent, employer, insurance entity, or other person with influence over the driver's behavior, or by a third party. The driver is then coached at a later time, typically days or weeks after the occurrence of the non-compliance event. Conventional camera based special purpose safety devices do not employ any visual or audible displays in the vehicle and do not take into consideration other risk factors, such as traffic, road conditions, driver fatigue level, or risk history.

Some special purpose safety devices installed in vehicles are multi-risk safety devices. Multi-risk safety devices can analyze a series of risks, such as speeding, lateral movement, lane position, acceleration/deceleration, and use an audible or visual warning system in the vehicle to alert the driver of a non-compliance event. One shortcoming of conventional multi-risk safety devices is that the warning system does not specify why or what single or combination of non-compliance events triggered a warning. Instead, a light may be displayed or a sound may warn the driver that one or more of the non-compliance events occurred. However, the driver would not know which event triggered the warning and would have no way of learning how to correct the detected risky behavior in real time. The driver would have to wait until access to a safety management system is available or meet with a driver sponsor to understand the non-compliance event. As an example of the drawbacks of such a multi-risk safety device, consider a multi-risk safety device that displays a red light when one of the non-compliance events occurs. The driver would not necessarily know which of the non-compliance events occurred and would not know how to correct the event. In this situation, the driver might become frustrated and may even begin to attempt to correct things that do not require correcting, further exacerbating the driver's risk. Similar to the single-risk safety devices described above, the multi-risk safety devices also do not take into consideration other risk factors, such as traffic, road conditions, driver fatigue level, or risk history.

Another deficiency of special purpose safety devices is an inability to adjust thresholds of an identified risk in response to specific driving situations. The conventional special purpose safety devices may underestimate risk to the extent that risky driving situations are not identified. For example, a conventional special purpose safety device may detect that a vehicle is not speeding without the knowledge that the roadway is icy and determine incorrectly that a driving risk situation is not present. Additionally, conventional special purpose safety devices may overestimate risk to the extent that false alarm mentoring messages are created. For example, a conventional special purpose safety device may determine that a hard braking event is a risky driving situation although the driver is driving in a high density urban area at rush hour where hard braking events are more common or even necessary to avoid collisions.

In addition to the deficiencies described above, conventional special purpose safety devices also suffer from high implementation, operation, and maintenance costs relative to accident costs that the devices prevent; delays and inaccuracies in processing information and providing timely and accurate performance feedback to drivers; inaccuracies and false alarms due to lack of situational awareness; limitations and ambiguities in the types of driving risks detected by the devices; ineffective and inaccurate notifications to drivers regarding a specific risk situation; and unclear or ineffective mentoring/intervention information presented to drivers regarding what to do to operate the vehicle more safely.

Accordingly, a need exists in the art for a driver monitoring and mentoring system that identifies risky driving situations in the context of a driver's real-time operational environment and provides effective interventions and countermeasures that mitigate the risky situations and reduce the likelihood of the driver having a vehicular accident. Another need exists for an adaptive risk threshold detection system that can dynamically adjust thresholds for presenting mentoring messages based on real-time situational data to more accurately identify accident risk and eliminate false alarm mentoring messages.

SUMMARY

The invention supports a driver safety management system that integrates features and functionality of a mobile device, such as a smartphone, into a comprehensive safety management platform for reducing motor vehicle accidents, violations, and associated costs along with the capability to increase overall effectiveness of a driver safety program. The inventive driver safety management system identifies risky driving situations in the context of a driver's real-time operational environment and provides effective interventions and countermeasures that mitigate the risky situation and reduce the likelihood of the driver having a vehicular accident.

One aspect of the invention provides a system for managing driver safety. This system includes a safety analytics computer system for generating at least one risk identification algorithm for determining a risk score indicating a likelihood that a driver will be involved in a vehicular accident based on a situation of a vehicle operated by the driver and a mobile device in communication with the safety analytics computer system. The mobile device can receive the risk identification algorithm from the safety analytics computer system; obtain situational information associated with the situation of the vehicle; execute the risk identification algorithm using at least the situation information to determine the risk score that the driver will be involved in a vehicular accident; and present a driver intervention to the driver if the risk score is above a risk threshold.

Another aspect of the invention provides a method for communicating a driver intervention to a driver to alert the driver of a driving risk. This method includes the steps of running a mobile safety center module on a smartphone; retrieving by the mobile safety center module information associated with a current driving situation for the driver; executing on the mobile safety center module a risk identification algorithm using at least the current driving situation information to determine if the current driving situation corresponds to a driving risk; and based on a determination that the current driving situation corresponds to a driving risk, presenting by the mobile safety center module a driver intervention indicative of the driving risk to the driver.

Another aspect of the invention provides a computer system for managing driver safety. This computer system includes a risk detection subsystem for generating risk identification algorithms that identify whether a driver of a vehicle is in one of multiple driving risk situations and determine a risk score for at least a portion of the driving risk situations; an intervention rules generator for generating an intervention rule for each of the driving risk situations, each intervention rule including at least one risk threshold and a driving intervention associated with the risk threshold for presentation to a driver if a risk score for the driver exceeds the risk threshold; a driver intervention subsystem for generating the driving interventions for the intervention rules; and a communications manager for communicating with one or more information sources to obtain driving situational information and for communicating with mobile devices associated with drivers to deliver the risk identification algorithms, intervention rules, and driving interventions to the mobile devices.

Another aspect of the invention provides a smartphone for communicating a driver intervention to a driver to alert the driver of a driving risk. This smartphone includes a processor, computer-readable memory, and a computer-readable storage media. This smartphone also includes a mobile safety center module. This mobile safety center module includes first computer program instructions for obtaining information associated with a current driving situation for the driver; second computer program instructions for using at least the current driving situation information to determine whether the current driving situation corresponds to a driving risk; and third computer program instructions for presenting a driver intervention indicative of the driving risk to the driver based on a determination that the current driving situation corresponds to the driving risk. Each of the computer program instructions of the mobile safety center module can be stored on the computer-readable storage media for execution by the processor by way of the computer-readable memory.

Another aspect of the invention provides a method for generating a first notice of loss. This method includes the steps of running a mobile safety center module on a mobile device associated with a driver; monitoring and recording by the mobile safety center module information associated with driving situations for the driver; detecting by the mobile safety center module that a vehicular accident has occurred involving a vehicle associated with the driver; receiving from the mobile safety center module information regarding the vehicular accident through a user interface for the mobile device; and issuing by the mobile safety center module a first notice of loss comprising an indication of the vehicular accident and the information regarding the vehicular accident received through the user interface to a master safety analytics center.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description in conjunction with the accompanying drawings in which.

DETAILED DESCRIPTION OF EXEMPLARY EMBODIMENTS

Exemplary embodiments of the invention are provided. These embodiments include systems and methods that identify risky driving situations in the context of a driver's real-time operating environment and provide effective interventions and countermeasures that mitigate the risky situation to reduce the likelihood of the driver having a vehicular accident. The system includes mobile safety centers individually installed on driver-assigned smartphones or other mobile devices. The mobile safety centers collect real-time driving data and compute a risk of a driver in a specific situation being involved in an accident and provide mentoring to drivers in a driver risk situation above a risk threshold to reduce the likelihood of an accident. The mobile safety centers communicate with a master safety analytics center that collects data, records accidents, collects and stores information relating to detected risk situations, creates risk algorithms, creates driving mentoring communications, and communicates the algorithms and communications to the mobile safety centers.

Embodiments of the invention can comprise one or more computer programs that embody the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed invention will be explained in more detail in the following description, read in conjunction with the figures illustrating the program flow.

Figure 1:
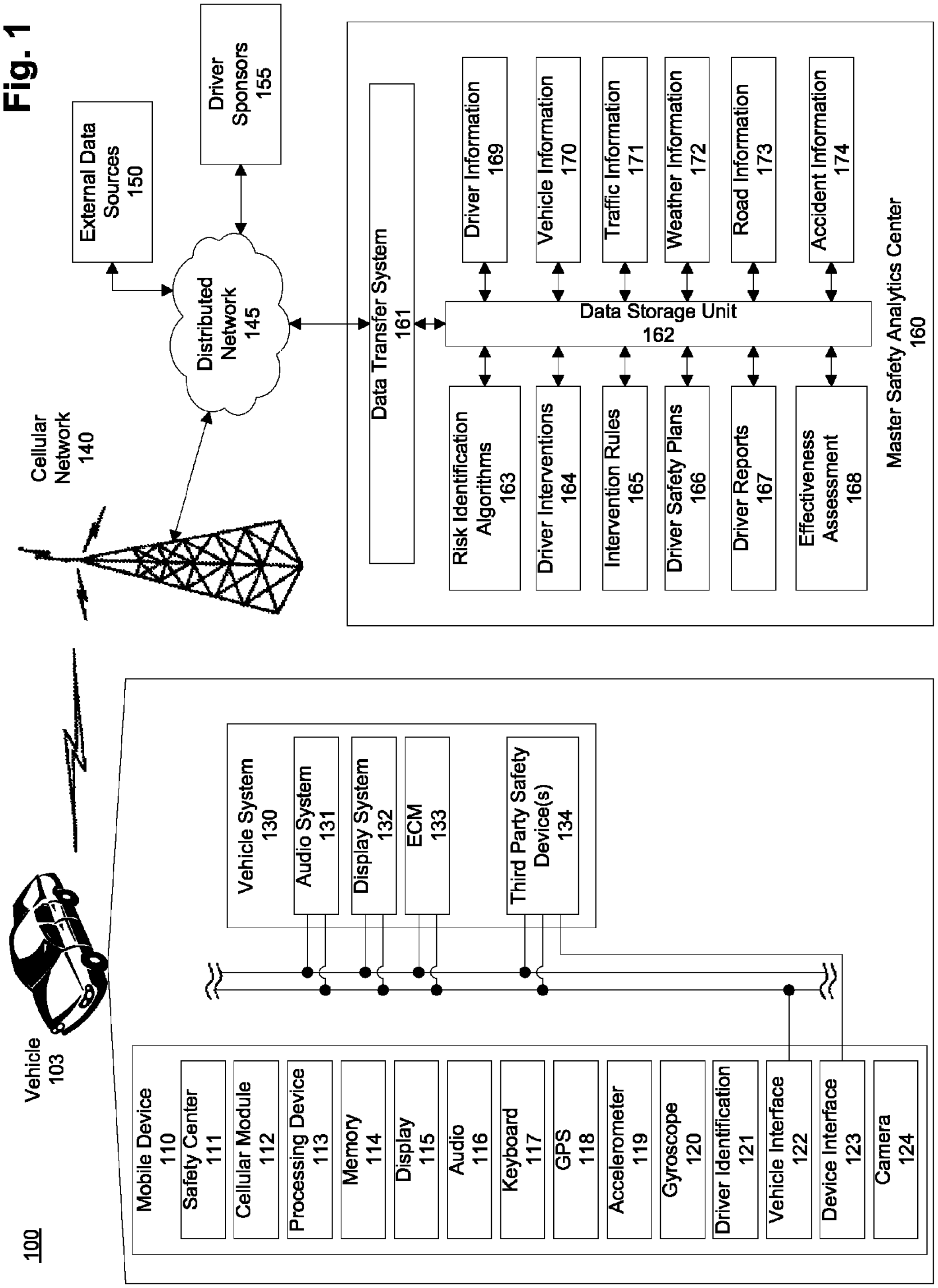
FIG. 1 is a block diagram depicting a safety management system in accordance with certain exemplary embodiments.

FIG. 1 is a block diagram depicting a safety management system 100 in accordance with certain exemplary embodiments. The safety management system 100 allows for the overall management of a motor vehicle safety program for one or more drivers. The safety management system 100 can be used to manage safety programs for commercial fleets, teen drivers, elderly drivers, or any other types or groups of drivers. The safety management system 100 also can be used by insurance entities as a value added service to their insured. One exemplary function of the safety management system 100 includes a core safety program that can be applied to all drivers in the program and generally includes functions that support selection of qualified drivers, initial driver training programs, manager training programs, recurrent driver training, periodic driver skills assessments, driver safety awards, and driver recognition. Another exemplary function of the safety management system 100 focuses on drivers considered most at risk to have an accident in the near future. As described in more detail below, the safety management system 100 can identify drivers likely to have an accident using data aggregation and analytical tools. The safety management system 100 can then take action in the form of a countermeasure or intervention with those drivers deemed most at risk.

The safety management system 100 performs at least two types of risk analysis that combine to create an adaptive risk detection and risk mitigation system. One type of risk analysis performed by the safety management system 100 determines a general likelihood that a driver will be in an accident in the near future. In certain exemplary embodiments, the safety management system 100 applies smartphone features to assess a driver's current driving performance, safety knowledge, and attitude to provide training and motivational communications to the driver. A second type of risk analysis performed by the safety management system 100 monitors selected driver performance characteristics and vehicle operating parameters while a vehicle is being driven (e.g., speed, use of turn signals, etc.) and uses supplemental environmental data (e.g., prior accident locations, road contours, traffic, weather conditions, etc.) obtained from external sources to compute pre-identified types of risk situations coincident with drivers who have been previously involved in accidents, such as a driver leaving a roadway and having a rollover accident. When the risk computation produces a value that exceeds an adjustable risk threshold, an intervention, such as a mentoring message, can be presented to the driver to mitigate the identified accident risk situation. For example, the safety management system 100 may identify that a driver committed a lane violation and display a message indicating this violation to the driver.

Referring to FIG. 1, the exemplary safety management system 100 includes a master safety analytics center ("MSAC") 160 and a mobile device 110 having a mobile safety center 111 installed thereon in communication with the MSAC 160. In this exemplary embodiment, the mobile safety center 111 includes one or more software modules that operate on the mobile device 110. For example, the mobile safety center 111 can be an application designed for and capable of running on the operating system, or platform, of the mobile device 110.

The mobile device 110, and thus the mobile safety center 111, is assigned or otherwise associated with a driver of a vehicle 103. The mobile safety center 111 collects real-time driving data and computes a risk of a specific driver in a specific situation being involved in an accident and provides mentoring to those drivers having a risk score above a risk threshold to reduce the likelihood of an accident. The MSAC 160 collects data, creates risk algorithms, creates driver mentoring communications, and deploys the algorithms and communications to the mobile safety center 110. Although only one mobile device 110 having a mobile safety center 111 is illustrated in FIG. 1, the MSAC 160 can communicate with any number of mobile devices 110. For example, each driver in a commercial fleet may be assigned a mobile device 110 having a mobile safety center 111.

The MSAC 160 includes a computer system, such as a workstation computer, a notebook computer, a server, or a group of servers. The MSAC 160 includes a data transfer system 161 that allows the MSAC 160 to communicate with other devices by way of a distributed network 145. The distributed network 145 can include a local area network ("LAN"), a wide area network ("WAN"), or the Internet. As described in further detail below, the distributed network 145 can be coupled to a cellular network 140 or a WiFi network (not shown) to provide for communications between the MSAC 160 and the mobile device 110.

The MSAC 160 can communicate with a variety of external data sources 150 by way of the distributed network 145 to gather information for use in a driver safety program and for use in developing risk identification algorithms 163, driver interventions 164, and intervention rules 165. The external data sources 150 can include Internet web sites or other types of data sources that provide real-time and historical information related to driver safety, including traffic information 171 (e.g., traffic density, traffic flow rates. etc.), weather information 172, and road characteristic information 173 (e.g., contours, elevation, construction, speed zones, real-time road conditions, etc.). The MSAC 160 can include a data storage unit 162 for consolidating and storing the information received from the external data sources 150, the mobile device 110 and driver sponsors 155. In certain exemplary embodiments, the data storage unit 162 can include a relational database for consolidating and storing information.

The MSAC 160 can store information associated with drivers that are a part of the driver safety program in the data storage unit 162. This driver information 169 can include driver characteristics for each driver in the driver safety program. Driver characteristic information can include any information associated with a driver, such as age, gender, training, driving experience, work requirements, previous citations, and accident history information. The driver information 169 can also include each driver's employment characteristics, such as work day information, shift schedule, start time, end time, work hours, miles driven, and pay received. The driver information 169 can also include job performance characteristics, such as service level and employment status. Such employment characteristics and job performance characteristics can be especially useful in a fleet management embodiment.

The MSAC 160 can also store information associated with vehicles, such as vehicle 103, that are operated by drivers that are a part of the driver safety program in the data storage unit 162. This vehicle information 170 can include manufacturer, model, age, class, special features, maintenance records, mileage, and safety rating information.

The MSAC 160 can also store accident history information 174. This accident history information 174 can be associated with a driver and/or a vehicle in the driver safety program. Additionally, accident information associated with certain roads, areas, and weather conditions may be obtained and stored in the data storage unit 162.

The MSAC 160 can use the above described information to produce driving risk identification algorithms 163 and store the risk identification algorithms 163 in the data storage unit 162. The risk identification algorithms 163 are used by the safety management system 100 to identify driving risk situations and to determine a probability that a driver will be involved in an accident. In certain exemplary embodiments, the risk identification algorithms 163 are mathematical formulas based on non-linear multi-variate analysis of accidents and driving situational data stored in the data storage unit 162. These formulas can identify driving risk situations and predict the risk of an accident occurring based on the driving risk situation. The safety management system 100 can use the risk identification algorithms 163 to compute a risk score for the driver's current situation and determine if a risk threshold is exceeded. If a risk threshold is exceeded by the driver, a driver intervention 164 can be communicated to the driver by way of the mobile device 110. This process is described in further detail below with reference to FIG. 3.

In certain exemplary embodiments, the MSAC 160 transmits the risk identification algorithms to the mobile device 110 and the mobile safety center 111 on the mobile device 110 uses the risk identification algorithms 163 to identify driving risk situations and to determine a probability that a driver will be involved in an accident. In these embodiments, the mobile safety center 111 retrieves driving situation information and executes the risk identification algorithms 163 using the retrieved driving situation information. In alternative exemplary embodiments, the MSAC 160 executes the risk identification algorithms 163 to identify driving risk situations and to determine a probability that a driver will be involved in an accident. In these alternative embodiments, the mobile safety center 111 retrieves driving situation information and transmits the retrieved information to the MSAC 160. The MSAC 160 executes the driving risk identification algorithms 163 using the retrieved information and, if a driving risk is identified, communicates a driver intervention 164 to the mobile safety center 111 for presentation to the driver.

Driver interventions 164 are monitoring or mentoring actions communicated to a driver when a risk threshold is exceeded. The driver interventions 164 can relate to specific risk situations, such as failing to signal during a lane change, driving too fast during a snowstorm, or any other driving situation that is deemed to be risky by the risk identification algorithms 163. The driver interventions 164 can include pre-planned actions extracted from the data storage unit 162 and communicated to the mobile device 110 as part of a driver safety plan 166 described below or in response to the MSAC 160 identifying a driving risk for a driver. The driver interventions 164 can include presenting a text message, graphic, or audio clip to the driver by way of the mobile device 110 or by way of a vehicle audio system 131 or display system 132. For example, if a driver is speeding on an icy road (approaching or exceeding a speed (not necessarily in violation of posted speed limits) on an icy road when a prior accident occurred), an audio message may be played by the mobile device 110 describing the risk situation and alerting the driver to slow down ("icy road conditions for next five miles, slow to 50 miles per hour"). Another example may be a speed sign graphic with an "X" through the graphic and/or an audio message stating "you are traveling too fast for the curve ahead in one tenth mile, slow to 45 mph." Other examples include a graphic display of a foot depressing hard on a gas pedal and an associated audio message for a rapid acceleration event. The driver interventions 164 can also include training videos that can be communicated to the driver at the end of a drive or shift. Table 1 below includes a non-limiting exemplary list of situations that the driver interventions 164 can be applied to.

The converse of these driver interventions 164 are also true. If a driver does not have any non-compliance events during a drive or at the end of a designated shift, these safe or low risk drivers may be presented with a graphical display of all events monitored along with a satisfactory indicator. The mobile device 110 can also deliver positive reinforcements, such as "Great Job," if the driver is exhibiting safe driving behavior. The mobile device 110 can also notify the driver before beginning a drive or shift of the driver's risk level to reduce the risk that a non-compliance event happens.

TABLE 1

| Exemplary Situations for Monitoring Drivers and Applying Driver Intervention | | | |
|---|---|---|---|
| Driver Fatigue | Following Distance (Day, Night, Weather, Traffic Adjusted) | Speed Management (Day, Night, Weather, Traffic, Local Speed Limit Adjusted) | Intersection Management |

TABLE 1-continued

Exemplary Situations for Monitoring Drivers and Applying Driver Intervention

| | | | |
|---|---|---|---|
| Stopping Distance | Braking Events | Acceleration | Deceleration |
| Turn Management | Curve Management | Lane Changing | Merging |
| Yielding | Exiting | Traffic Circle Management | Idle Time |
| Fuel Efficiency | Mileage Reporting | Parking and Backing (Parallel, Parking Lot, Loading Dock) | Roll Stability |
| Rear End Collisions | Driver Distraction (Phone Calls, Text Messaging, Computing, Display Devices) | Seatbelt Use | Mirror Adjustment |
| Blind Spots | School Zone Management | DUI/DWI | Bridge and Other Structural and Non-Structural Clearance |
| Tire and Vehicle Management | Weather and Adverse Conditions | Emergency Management (Fire/EMT Drivers) | Passenger Safety (Van, Bus Safety, Multiple Passengers that Violate Teen Driver GDL Requirements) |
| Load Management | Steering Wheel Position and Hand Placement | Aggressive Driving and Road Rage | Highway Driving |
| Situational Driving (Driver Training Class, Defensive Driving, Ride-Alongs, Coaching Drives) | Material Storage | Vehicle Theft/ Kidnapping | Traffic Signal and Road Sign Management |
| Vehicle Breakdown (Flat Tire, Overheating) | Vehicle Emergencies (Hydroplaning, Locked Accelerator, Tire Blowout) | Four-Wheel Drive Handling | Rear Wheel Drive Handling |
| Front Wheel Driver Handling | All Wheel Drive Handling/Traction Control | Anti-lock Braking Systems | Air Brake Systems |
| Hazardous Materials Transportation | Engine Fires | Skid Control | Visual Scanning/ Peripheral Vision |
| Uneven Pavement | Road Shoulder Management | Commercial Driver's License Requirements | Lane Positioning |
| Hill (Incline and Decline) Management | Bridge Management | Toll Booth and Automated Toll Management | Rental Car Management |
| Wind Shear | Pedestrian Safety | Railroad Crossings | Space Management |
| Construction/Work Zones | Fog Area and Fog Management | High Beam and Low Beam Use | Hand Signaling |
| Motorcycle Safety | Manual Transmission Use | Automatic Transmission Use | Cruise Control |

The driver interventions 164 can be presented to drivers based on intervention rules 165. The intervention rules 165 are driver- and risk-situation specific rules that define risk thresholds and associated driver interventions 164 to be presented to the drivers if the threshold for that risk situation if exceeded. Intervention rules 165 may be general for a driver population based on analysis of accident information 174 and situations in the data storage unit 162 or may be specifically set for individual drivers by driver sponsors 155. Driver sponsors 155 may be a parent, employer, insurance entity, or any other person with influence over the driver's behavior. The intervention rules 165 are stored in the data storage unit 165 and can be transmitted to the mobile device 110 along with the driver safety plan 166 for that driver.

The intervention rules 165 can include multiple risk thresholds, each having a different driver intervention 164 or other response. For example, when a lower risk level threshold is breached a video or audio message may be communicated to the driver. If the driver does not correct the situation and instead causes a higher risk level threshold to be breached, a message may be sent to a driver sponsor 155 for that driver to notify the driver sponsor 155 of the event. Additionally, a visual or audio message may be presented to the driver indicating that the driver sponsor 155 has been notified of their non-compliance or risky event.

The MSAC 160 can compute a general likelihood that a driver will be in an accident in the near future based on a driver's current performance, safety knowledge, and attitude. The current performance of a driver can be determined from information received in one or more summary driver performance reports 167 described below. The MSAC 160 can determine the driver's safety knowledge using assessments completed by the driver or training records of the driver stored in the data storage unit 162. The MSAC 160 can assess the attitude of the driver using safety assessments and the driver's responses to driver interventions 164 provided in the summary driver performance reports 167. In certain exemplary embodiments, the MSAC 160 may assign each driver a general risk score or category, such as low risk, medium risk, and high risk.

The MSAC 160 can automatically adjust driver interventions 164 and intervention rules 165 according to the general accident risk likelihood of each specific driver and can provide more frequent driver interventions 164 to those drivers identified by the MSAC 160 as being more likely to have accidents. In certain exemplary embodiments, the risk thresholds of the intervention rules 165 can be adjusted based on the general risk likelihood of a driver. For example, a driver identified as a low overall risk of having an accident, who is also monitored by the MSAC 160 to exhibit safe driving behavior, may only receive driver interventions 164 in very high risk situations. A driver identified as a high overall risk of having an accident, who is monitored by the MSAC 160 to be exposed to moderate risk situations, may be presented more frequent driver interventions 164 in addition to being presented driver interventions 164 in high risk situations.

Driver safety plans 166 are planned actions to promote improved driving behavior for a specific driver. These driver safety plans 166 can include driver interventions 164 and intervention rules 165 having one or more risk thresholds associated with the driver. The driver safety plans 166 can also include driver training videos and driver assessments to be communicated and conducted with the driver using the mobile device 110. The results of the assessments can be transmitted from the mobile device 110 to the MSAC 160 for storage in the data storage unit 162. The driver safety plans 166 may be used as a general driver training system by either the driver, driver sponsors, or driver trainers by adjusting risk thresholds of the intervention rules 165 to force mentoring messages to be communicated more or less frequently.

The MSAC 160 can develop driver safety plans 166 for each driver in a driver safety program using business rules and/or neural network technologies. The MSAC 160 can use the general accident risk likelihood for the driver to adjust risk thresholds in the driver interventions 164 in the driver's safety plan 166. The MSAC 160 can also include a user interface (not shown) that allows driver sponsors 155 to implement a custom driver safety plan 166 for a driver, including assessments of driver knowledge and safe driving attitude and driver training. The MSAC 160 can automatically deliver revised driver safety plans 166 to the driver's mobile device 110.

The MSAC 160 can perform an effectiveness assessment 168 on measurement data collected by the mobile device 110 and communicated to the MSAC 160. The effectiveness assessment 168 consolidates data from multiple mobile devices 110 and uses the collected data to determine which risk identification algorithms 163, risk thresholds of driver intervention rules 165, and driver interventions 164 are most effective at reducing specific types of driving accidents. The result of this effectiveness assessment 168 can be used by the MSAC 160 to modify future risk identification algorithms 163, risk thresholds, driver interventions 164, and driver safety plans 166.

The MSAC 160 can periodically collect information from external sources 150 (e.g., weather, traffic, accident, and construction site information) and driver sponsors 155 and use the information to further refine the risk assessment and driver communication functions. The MSAC 160 can periodically update the risk identification algorithms 163, the driver interventions 164, and the driver intervention rules 165 based on collected information. This, in turn, improves the accuracy of risk assessments, identifies additional risk situations, eliminates ineffective driver mentoring messages, refines threshold settings, and creates new driver notifications relating to new risk situations.

The MSAC 160 can also store information associated with detected risk situations in the data storage unit 162 for further analysis by the MSAC 160 to identify recurrences of risk conditions relating to one or more drivers. This information can used by the MSAC 160 to alert other drivers of risk situations when approaching the recurrent risk areas under similar conditions.

Figure 2:
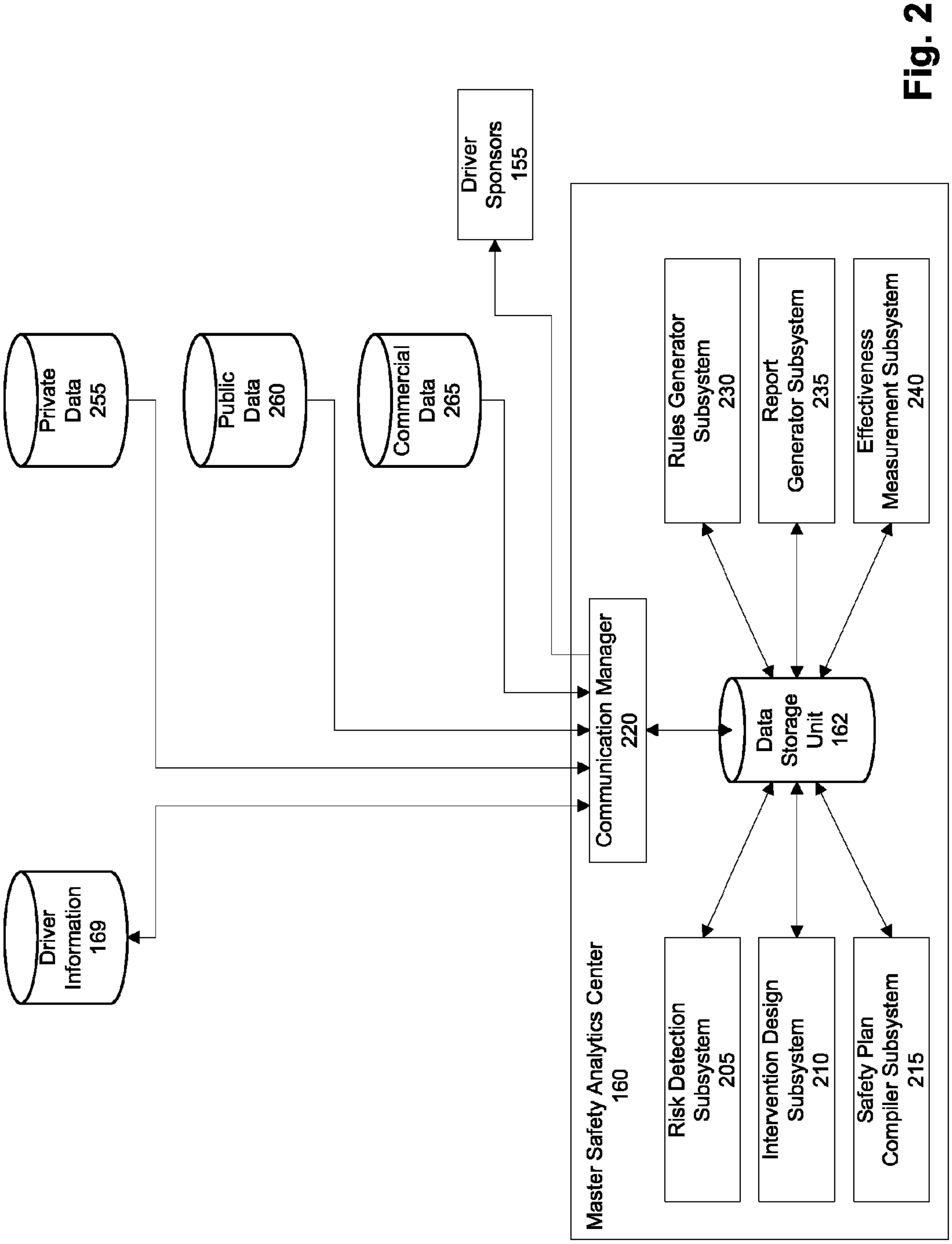
FIG. 2 is a block diagram depicting processing operations performed by the master safety analytics center of FIG. 1 in accordance with certain exemplary embodiments.

FIG. 2 is a block diagram depicting processing operations performed by the MSAC 160 of FIG. 1 in accordance with certain exemplary embodiments. Referring to FIGS. 1 and 2, the MSAC 160 includes a communication manager 220 for communicating with the mobile device 110, the external data sources 150, and the driver sponsors 155. The MSAC 160 communicates with external data sources 150 to obtain public data 260, such as weather information 170 and traffic information 171. The MSAC 160 also communicates with external data sources 150 to obtain commercial data 265, such as employment characteristics and vehicle information 170. The MSAC 160 communicates with the mobile device 110 to send and receive information associated with a particular driver, such as driver safety plans 166 and summary driver performance reports 167. The MSAC 160 also sends summary driver performance reports to driver sponsors 155.

The communications manager 220 can access the data storage unit 162 to store information received from the external data sources 150 and the mobile device 110 and to retrieve information to send to the mobile device 110, external data sources 150, and driver sponsors 155.

The MSAC 160 includes a risk detection subsystem 205 for creating and updating the risk identification algorithms 163. The risk detection subsystem 205 can create the risk identification algorithms 163 using accident and situational data stored in the data storage unit 162. The risk detection subsystem 205 can access and update risk identification algorithms 163 stored in the data storage unit 162 based on any updated information received by the MSAC 160.

The MSAC 160 also includes an intervention design subsystem 210 and a rules generator subsystem 230. The intervention design subsystem 210 defines the driver interventions 164 that are communicated to the drivers when a risk situation threshold is exceeded. The rules generator subsystem 230 associates the driver interventions 164 defined by the intervention design subsystem 210 with actual risk situations. The rules generator subsystem 230 also defines the driver intervention rules 165 and their associated thresholds.

The MSAC 160 also includes a safety plan compiler subsystem 215 that aggregates the risk identification algorithms 163, driver interventions 164, and driver intervention rules 165 for driver safety plans 166. The safety plan compiler subsystem 215 can also associate additional training materials and assessments into the driver safety plans 166 to improve driver performance using a scheduled set of activities defined by driver improvement rules or driver sponsors 155.

The MSAC 160 also includes a report generator subsystem 235 that summarizes driver performance data for use by the drivers and the driver sponsors 155. The communications manager 220 can transmit reports generated by the report generator subsystem 235 to the mobile device 110 and to the driver sponsors 155.

The MSAC 160 also includes an effectiveness measurement subsystem 240 that performs the effectiveness assessment 168 described above with reference to FIG. 1. The effectiveness measurement subsystem 240 can evaluate risk identification algorithms 163, risk situation thresholds, driver interventions 164, driver intervention rules 165 and driver safety plans 166 based on success in reducing driver unsafe behaviors and accidents.

Referring back to FIG. 1, the mobile device 110 can include a smartphone, personal digital assistant ("PDA"), notebook computer, or other portable wireless computing device. The mobile device 110 includes standard components, such as a processing device 113 (e.g., microprocessor), device resident memory 114 (e.g., RAM, ROM, and flash memory), a display 115 (e.g., LCD or touchscreen display), audio 116 (e.g., speakers, earphone port), and a keyboard 117. The mobile device 110 also includes a communications module, such as a cellular communications module 112 and/or a WiFi module (not shown). In this exemplary embodiment employing a cellular communications module 112, the mobile device 110 can communicate with the MSAC 160 by way of a cellular network 140 in communication with a distributed network 145. Alternatively or additionally, the mobile device 110 may communicate with the MSAC 160 by way of a WiFi module in communication with a WiFi network (not shown) connected to the distributed network 140.

The mobile device 110 can store and execute software applications, such as the mobile safety center 111. The mobile safety center 111 is a highly customizable and personal platform for use in the safety management system 100. The mobile safety center 111, in conjunction with components and features of the mobile device 110, can collect real-time driving data. The mobile safety center 111 can use this real-time driving data along with the risk identification algorithms 163 and intervention rules 165 to compute the risk that a driver in a specific situation will be in an accident and to provide driver interventions 164 to the driver if the risk exceeds a risk threshold of one of the intervention rules 165. In certain exemplary embodiments, the mobile safety center 111 can communicate the collected real-time driving data to the MSAC 160 and the MSAC 160 can use the collected real-time driving data along with the risk identification algorithms 163 and intervention rules 165 to compute the risk that a driver in a specific situation will be in an accident. If the risk exceeds a risk threshold of one of the intervention rules 165, the MSAC 160 transmits an appropriate driver intervention 164 to the mobile device 110 for presentation to the driver.

The real-time driving data that the mobile safety center 111 collects can depend on the features and components of the mobile device 110 upon which the mobile safety center 111 is installed. In this exemplary embodiment, the mobile device 110 includes a global positioning system ("GPS") receiver 118, an accelerometer 119, and a gyroscope 120.

The mobile safety center 111 can communicate with the GPS receiver 118 to determine when the mobile device 110 is in a moving vehicle, such as the vehicle 103, the speed of the vehicle 103, and the actual geographic position of the vehicle 103. The mobile safety center 111 can communicate with the accelerometer 119 and the gyroscope 120 to obtain information associated with the vehicle's 103 acceleration, deceleration, and lateral movement. The mobile safety center 111 can also communicate with the accelerometer 119 to determine whether the vehicle's 103 inertia and/or motion has changed. The information obtained from the accelerometer 119 and the gyroscope 120 can be used by the mobile safety center 111 to determine if the vehicle 103 is rapidly accelerating, rapidly decelerating, and/or navigating a turn in a road. This information can be used by the mobile safety center 111 along with other information, such as vehicle speed, road conditions, traffic information 171, and weather information 172, to determine if a risk situation is present.

The exemplary mobile device 110 also includes a vehicle interface 122 that allows the mobile safety center 110 to communicate with an onboard vehicle system 130 of the vehicle 103. The vehicle interface 122 can include a digital cable connection interface and/or a wireless connection interface (e.g., BLUETOOTH) to enable connection to the vehicle's 103 onboard system 130. For example, some vehicles 103 include a J-Bus (e.g., Class 6-8 truck) or a CAN-Bus (e.g., automobile or Class 1-5 truck) that enables the vehicle interface 122 to collect vehicle information regarding driving behavior and vehicle performance (such as an anti-lock braking system or vehicle stability control system being activated).

The onboard vehicle system 130 can include an audio system 131 (e.g., radio), a display system 132 (e.g., in-dash display), an engine control module ("ECM") 133, and third party safety devices 134. The mobile safety center 111 can obtain data relating to vehicle trip starts and stops, engine operations, transmission operations, fuel efficiency, and the use of accelerators, brakes, and turn signals from the ECM 133. The mobile safety center 111 can collect data from third party safety devices 134, such as anti-lock braking systems ("ABS") and roll stability systems. Although not shown, the mobile safety center 111 can also communicate with after market devices, such as radars, cameras, and gyro meters by way of the vehicle interface 122 or a device interface 123, such as a universal serial bus ("USB") interface or the like.

The mobile device 110 can also include a camera 124 capable of taking still pictures and/or video. Alternatively, the mobile device 110 may be coupled to a separate camera (not shown) by way of a device interface 123. If the mobile device 110 includes or is connected to a camera 124, the mobile safety center 111 can additionally perform the functions of identifying the following distance of the vehicle 103 relative to that of other vehicles; identifying driver vehicle lane departures including moving onto roadway shoulder; computing safe following distance and appropriate stopping distance; and collecting imagery information regarding vehicle accidents and/or abrupt acceleration and velocity changes. To determine the following distance of the vehicle 103 relative to that of other vehicles, the camera 124 can include an autofocus feature and the following distance can be calculated based on the focus of the camera 124.

The mobile safety center 111 can use the information obtained from the camera 124 alone or in combination with other driving risk situation information (e.g., vehicle speed, weather, traffic, road conditions, etc.) as input to the risk identification algorithms 163 in real-time to determine if a driving risk situation is present. For example, the mobile safety center 111 may determine using the risk identification algorithms 163 that a risk situation is present if the vehicle 103 at its current speed is following another vehicle too closely. The mobile device 110 or external camera can be docked to position the camera 124 at the roadway.

The mobile safety center 111 can monitor the above described information and correlate the monitored information with environmental data (e.g., traffic information 171, weather information 172, and road information 163). For example, the mobile safety center 111 can correlate the vehicle location and movement with reference to a map location, road features, weather, road conditions, road construction, speed limits, and previous accident locations.

The camera 124 can also be used to document safety hazards and to document that correct safety procedures are followed. For example, in a paratransit embodiment, a driver can use the camera 124 to document that a wheelchair is properly secured in a vehicle 103. The driver may take pictures of each required mechanism for securing the wheelchair in the vehicle. In another example, the camera 124 may be used to record a video of the driver assisting a person into the vehicle 103. In a commercial trucking embodiment, the camera can record the proper placement and securement of cargo in a flatbed or automobile hauling operation. These pictures and videos may be transferred from the mobile device 110 to the MSAC 160 for storage.

The mobile safety center 111 can calculate a risk score for one or more risk situations based on the monitored information and the environmental data using the risk detection algorithms 163. In a simple example, the mobile safety center 111 may monitor speeding situations only. In this example, the mobile safety center 111 can obtain the speed of the vehicle 103 (e.g., from the GPS receiver 118 or the ECM 133) and the location of the vehicle 103 (e.g., from the GPS receiver) and input this information into the risk identification algorithms 163 along with speed limit information (from the road information 173) for the road that the vehicle 103 is currently located. The risk identification algorithms 163 would then compute a risk score for that situation. After determining a risk score for the situation, the mobile safety center 111 can then compare that risk score to a risk threshold in one or more intervention rules 165 related to speeding to determine if a driver intervention 164 should be presented to the driver.

The mobile safety center 111 can present driver interventions 164 to the driver by way of the mobile device display 115 or the mobile device audio 116. Additionally, if the mobile device 110 has a vehicle interface 122, the mobile safety center 111 may present driver interventions 164 by way of the vehicle audio system 131 or the vehicle display system 132.

After presenting the driver intervention 164 to the driver, the mobile safety center 111 can monitor the driver's response. For example, if the driver was speeding and received a driver intervention 164 alerting the driver to slow down, the mobile safety center 111 may monitor the speed of the vehicle 103 and record whether the driver slowed to a safer speed.

The mobile safety center 111 can record information and periodically generate summary driver performance reports 167 and communicate these reports to the MSAC 160. The MSAC can, in turn, provide the summary driver performance reports 167 to driver sponsors 155. The summary driver performance reports are summary assessments of driver risk situations detected, interventions provided, and the driver's response to the interventions. The summary driver performance reports 167 summarize to drivers and driver sponsors 155 what the driver specifically did correctly (e.g., maintained proper following distance behind other vehicles) and incorrectly (e.g., speeding, hard-braking events, etc.) during recent drives. A driver sponsor 155 can use the summary driver performance reports 167 to take action directly or by way of the driver safety plans 166 to further improve the driver's behavior. For example, a driver sponsor 155 may include a training video or revise an intervention rule 165 to correct past risky driving behavior.

The mobile safety center 110 can communicate with the MSAC 160 to periodically obtain updated traffic information 171, weather information 172, and road information 173. The mobile safety center 111 can also obtain updated driver safety plans 166 having updated risk identification algorithms 163, driver interventions 164, and intervention rules 165.

In certain exemplary embodiments where the mobile device 110 is a smartphone, the mobile safety center 111 can determine when the driver is operating the mobile device 110 as a mobile telephone or operating the keyboard 117 for text messaging or other purposes while the vehicle 103 is moving. The mobile safety center 111 can prevent this from occurring by disabling the mobile device 110 from being used for voice and/or text communications while the vehicle 103 is in motion (using cellular network data, GPS, gyro meter or accelerometer sensors to detect motion). The mobile device 110 may also be partially or completely disabled from providing some or all driver interventions 164 if the driver is in a situation where driver interventions 164 may be distracting. For example, a driver intervention 164 may include both a display portion and audio portion. If the audio portion is distracting, the audio may be suppressed while the display remains enabled.

The mobile device 110 can include a driver identification module 121 for detecting the identity of the driver. The driver identification module 121 can require a password or a username and password. Alternatively or additionally, the driver identification module 121 can employ biometric technology to identify the driver. The mobile safety center 111 can use the driver identity to determine the appropriate driver safety plan 166 to use and to prepare a summary driver performance reports 167 for the correct driver.

Many commercially available smartphones include a set of features that enable the smartphones to effectively function as the mobile device 110 for hosting the mobile safety center 111. The functions of a smartphone can be implemented at a fraction of the cost of a conventional special purpose safety device. This cost advantage significantly improves the value proposition of the overall safety management system 100 compared to systems based on special purpose safety devices.

As used throughout the specification, the term "smartphone" should be interpreted as a mobile or cellular telephone having both standard (cellular network data, messaging (including 911 emergency location functions) and voice communication functions) and advanced functionality with respect to traditional cellular telephones. For example, an exemplary smartphone may have functionality including operating system software, a programming language, device resident memory, and device resident data storage. This technical functionality provides a platform by which third party developers can build and install applications directly on the smartphone. In addition to voice communications, smartphones also provide Internet, WiFi, and BLUETOOTH communication capabilities. Typically, smartphones also include cameras capable of still images, full motion video, and capability to play various formats of audio files. Smartphones also commonly include high resolution programmable displays and data entry functionality (e.g., touchscreens or keyboards). Some more advanced smartphones also include more advanced internal circuitry and device functionality, such as GPS, accelerometers, gyroscopes, biometric sensors and other sensor functionality. Some examples of currently available smartphones include the APPLE IPHONE, the GOOGLE ANDROID, the MOTOROLA DROID, and the RIM BLACKBERRY.

Figure 3:
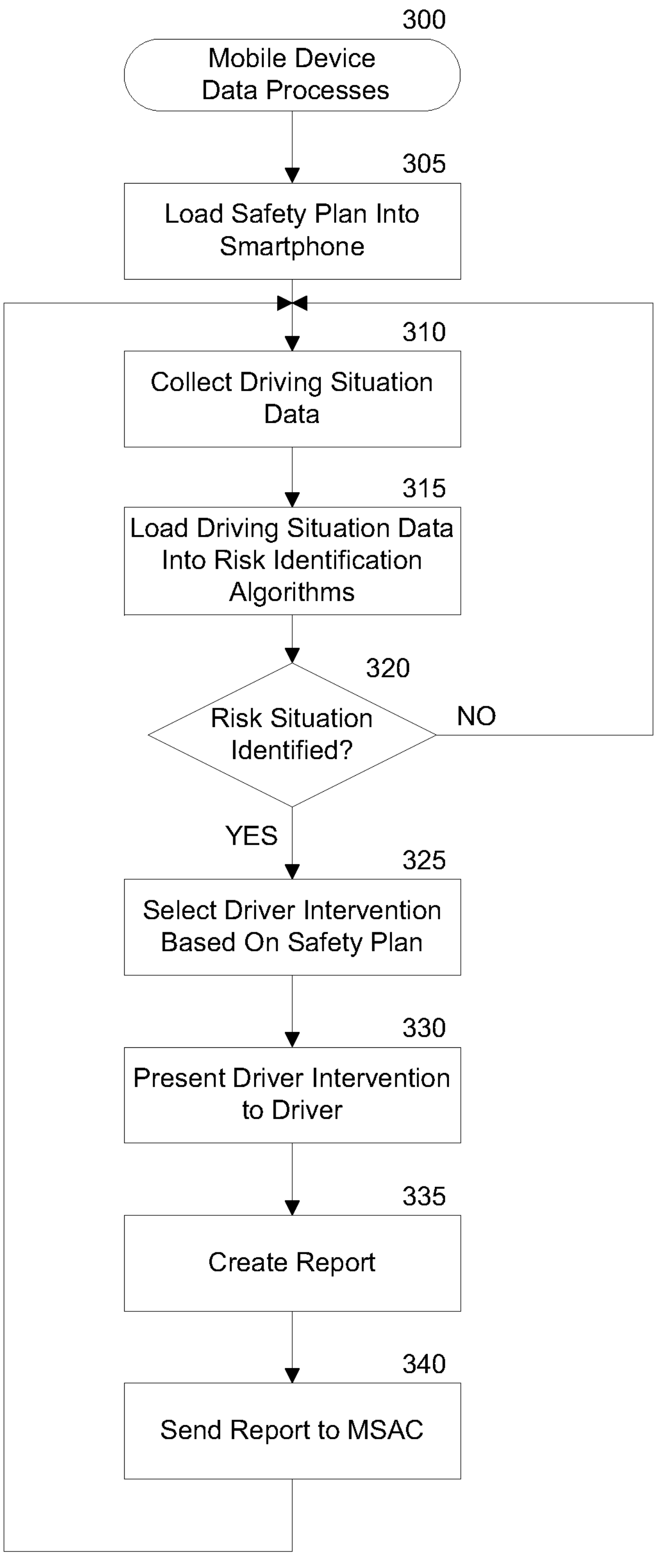
FIG. 3 is a flow chart illustrating processes performed by the mobile device of FIG. 1 in accordance with certain exemplary embodiments.

FIG. 3 is a flow chart illustrating processes 300 performed by the mobile device 110 of FIG. 1 in accordance with certain exemplary embodiments. Referring to FIGS. 1 and 3, in step 305, a driver safety plan 166 for a driver is loaded onto the mobile device 110 associated with the driver by the MSAC 160. As described above with reference to FIG. 1, the driver safety plan 166 can include risk identification algorithms 163, driving situational information, driver interventions 164, and intervention rules 165 personalized for the driver. Other components of a general safety program, such as assessments and training modules, can also be transmitted to the mobile device 110. The driver safety plan 166 can be transmitted from the MSAC 160 to the mobile device 110 by way of the distributed network 145 and the cellular network 140 or a WiFi network.

In step 310, the mobile safety center 111 installed on the mobile device 110 collects driving situation data. The mobile safety center 111 can collect some driving situation data from the mobile device 110, such as vehicle acceleration, deceleration, lateral movement, speed, and position. The mobile safety center 111 also can collect some driving situation data from the MSAC 160 or from the driving situation data included with the driver safety plan 166. This driving situation data can include roadmaps, weather, traffic conditions, road conditions, road construction, speed limits, and other accident risk hazards.

In step 315, the mobile safety center 111 loads the collected driving situation data into the risk identification algorithms 163 from the driver safety plans 166 and executes the risk identification algorithms 163 to determine if there is a risk situation. The risk identification algorithms 163 can compute a risk score for multiple situations to determine if a risk situation is present. If the mobile safety center 111 determines that there is a risk situation, the process 300 proceeds to step 325. Otherwise, the process 300 returns to step 310 and the mobile safety center 111 continues to collect driving situation data.

In step 325, the mobile safety center 111 compares the risk score associated with each risk situation identified by the risk identification algorithms 163 to risk thresholds in the intervention rules 164 associated with the risk situations to determine which driver intervention 164 should be presented to the driver. In step 330, the mobile safety center 111 presents the selected driver intervention 164 to the driver.

Although steps 315-325 are described in terms of the mobile safety center 111, the MSAC 160 can also perform these steps. For example, the mobile device 110 can communicate the driving situation data collected in step 310 to the MSAC 160. The MSAC 160 can then load the received driving situation data into the risk identification algorithms 163 stored in the data storage unit 162 and execute the risk identification algorithms 163 to determine if there is a risk situation and to compute a risk score for multiple situations to determine if a risk situation is present. If the MSAC 160 determines that a risk situation is present, then the MSAC 160 compares the risk score associated with each risk situation identified by the risk identification algorithms 163 to risk thresholds in the intervention rules 164 stored in the data storage unit 162 to determine which driver intervention 164 to present to the driver. The MSAC 160 can then communicate the determined driver intervention 164 to the mobile safety center 111 for presentation to the driver.

In step 335, the mobile safety center 111 creates a summary driver performance report 167 for the driver. Although step 335 is depicted as occurring after a driver intervention 164 is presented to the driver, summary driver performance reports 167 can be created at any time and the occurrence of a risk situation is not necessary for a summary driver performance report 167. For example, a summary driver performance report 167 may be created at the end of a shift or at the conclusion of a drive made by a fleet driver regardless of whether any risk situations were identified by the mobile safety center 111. After the summary driver performance report 167 is created, the mobile device 110 sends the summary driver performance report 167 to the MSAC 160 in step 340. After step 340, the process 300 returns to step 310.

To illustrate the operation of one embodiment of the invention, an example is provided. The example disclosed herein is not intended to limit the scope of the foregoing disclosure, and instead, is provided solely to illustrate one particular embodiment of the invention as the invention relates to one specific risk situation. Referring to FIGS. 1-3, in this example, a driver is assigned a smartphone mobile device 110 having a mobile safety center 111 installed thereon. Prior to a particular drive, in step 305, the mobile safety center 111 communicates with the MSAC 160 to obtain a driver safety plan 166 for the driver. The driver safety plan 166 includes risk identification algorithms 163, driver interventions 164, and intervention rules 165 associated with the driver.

In step 310, the mobile safety center 111 collects driving situation data as the driver operates a vehicle 103. In this example, the mobile safety center 111 obtains the speed of the vehicle 103, the weather in the location of the vehicle, the speed limit of the road that the vehicle is located, and the conditions of that road. The mobile safety center 111 can obtain the speed of the vehicle from the GPS receiver 118 or from the ECM 133 of the vehicle 103 by way of the vehicle interface 122. The mobile safety center 111 may also obtain the location of the vehicle from the GPS receiver 118 and use the location information to obtain the appropriate weather, speed limit, and road condition information. This information may be periodically communicated to the mobile device 110 by the MSAC 160 and stored in memory 114 for access by the mobile safety center 111. Additionally, the mobile device 110 can request this information from the MSAC 160.

In step 315, the mobile safety center 111 loads the speed, weather, speed limit, prior accident locations and road condition information into the risk identification algorithms 163 and executes the risk identification algorithms 163. For the purposes of this example, consider the speed of the driver to be 55 MPH, the weather to be cold and snowing, the speed limit to be 50 MPH, and the road conditions to be icy. Based on these conditions, the risk identification algorithms 163 may determine a high risk score for an icy road condition and a moderate risk score for a speeding risk condition. Because at least one risk situation is identified, the mobile safety center 111 compares the risk score for each risk situation to risk thresholds in the intervention rules 164 to determine which intervention should be presented to the driver. In this example, a risk score for the icy road condition would likely exceed the risk threshold for an icy road condition intervention rule 164. However, a risk score for the speeding risk condition may not exceed a risk threshold for a speeding condition intervention rule 164. Thus, the mobile safety center 111 determines that an icy road intervention should be presented to the driver in step 325. Alternatively, the mobile safety center 111 may determine to present both the icy road intervention and the speeding condition intervention or a combination speeding while on an icy road intervention to the driver.

In step 330, the mobile safety center 111 presents the icy road intervention to the driver. The icy road intervention may be an audio message, such as "caution, icy roadways detected," played through the mobile device 110 audio system 116 or the vehicle 103 audio system 131. Or, the icy roadway intervention may be a video or graphic showing an icy road displayed on the mobile device 110 display 115 or the vehicle 103 display system 132.

If the mobile safety center 111 did not identify a risk situation in step 320, the mobile safety center 111 may determine whether a potential risk situation is present.

Continuing the example, consider a situation where the mobile safety center 111 detects that the driver is speeding, but has not considered the weather or road conditions. The mobile safety center 111 can request this weather and road condition information, or any other relevant information such as traffic density, from the MSAC 160 in order to determine if a risk situation is present. After receiving the supplemental information in step 355, the mobile safety center 111 can use the previous information along with the supplemental information in steps 310-330 to determine whether to present a driver intervention 164 to the driver.

Figure 4:
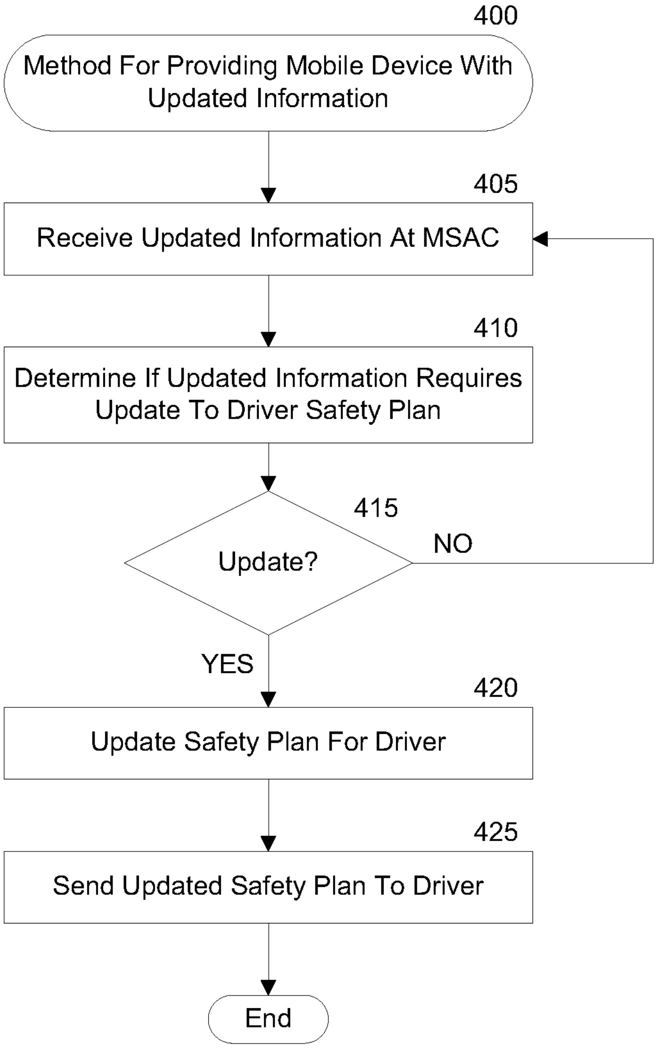
FIG. 4 is a flow chart illustrating a method for providing the mobile device of FIG. 1 with updated information in accordance with certain exemplary embodiments.

FIG. 4 is a flow chart illustrating a method 400 for providing the mobile device 110 of FIG. 1 with updated information in accordance with certain exemplary embodiments. Referring to FIGS. 1, 2, and 4, in step 405, the MSAC 160 receives updated information. This updated information can include updated traffic information 171, weather information 172, road information 173, driver visibility conditions, traffic pattern changes, and other information collected from external data sources 150. The updated information can also include information regarding a driver's trip plan. For example, a commercial driver may be rerouted to another location or one or more stops on a driver's schedule may be removed or replaced.

In step 410 the MSAC 160 determines whether to update a driver's safety plan 166 based on the updated information received. In certain exemplary embodiments, this determination can be based on a potential driving risk presented by the information and/or based on an updated trip plan. For example, the updated information may indicate that the driver will be navigating icy roads based on an update in the weather information 172 or an update to the driver's trip plan. In a commercial fleet embodiment or other embodiments having multiple drivers, the MSAC 160 may evaluate each driver in the fleet using updated information relevant to each driver.

In certain exemplary embodiments, the mobile safety center 111 may request an update to the driver safety plan 166 for the driver. This request may be a periodic request or based on a change to the driver's trip plan. For example, the mobile safety center 111 may detect (e.g., using the GPS receiver 118) that the driver has departed from a scheduled route and determine that an update to the driver's safety plan 166 is necessary. Also, the driver may enter a new trip plan into the mobile device 110.

The mobile safety center 111 may also request updated information based on certain driving conditions, such as the sun being at an elevation such that it impairs the driver's vision, visibility impairing fog is present, bridge road surface is icy, or the vehicle 103 is in a location where prior accidents have occurred and specific causes are unknown.

In step 415, if the MSAC 160 determines to update the driver's safety plan 166, the method 400 proceeds to step 420. Otherwise the method 400 returns to step 405.

In step 420, the safety plan compiler subsystem 215 updates the safety plan 166 for the driver using the updated information. This update can include an update to the risk identification algorithms 163, driver interventions 164, and intervention rules 165 included in the safety plan 166. In step 425, the MSAC 160 sends the updated safety plan 166 to the mobile device 110 for use by the mobile safety center 111.

In certain exemplary embodiments, the mobile safety center 111 can periodically notify the MSAC 160 of the speed and location of the vehicle 103. The MSAC 160 can use this speed and location information to track the vehicle's 103 progress as it relates to a trip plan and detect and notify the mobile safety center 111 of upcoming risk areas and update the safety plan 166 with driver interventions 164 corresponding to the upcoming risk areas.

Figure 5:
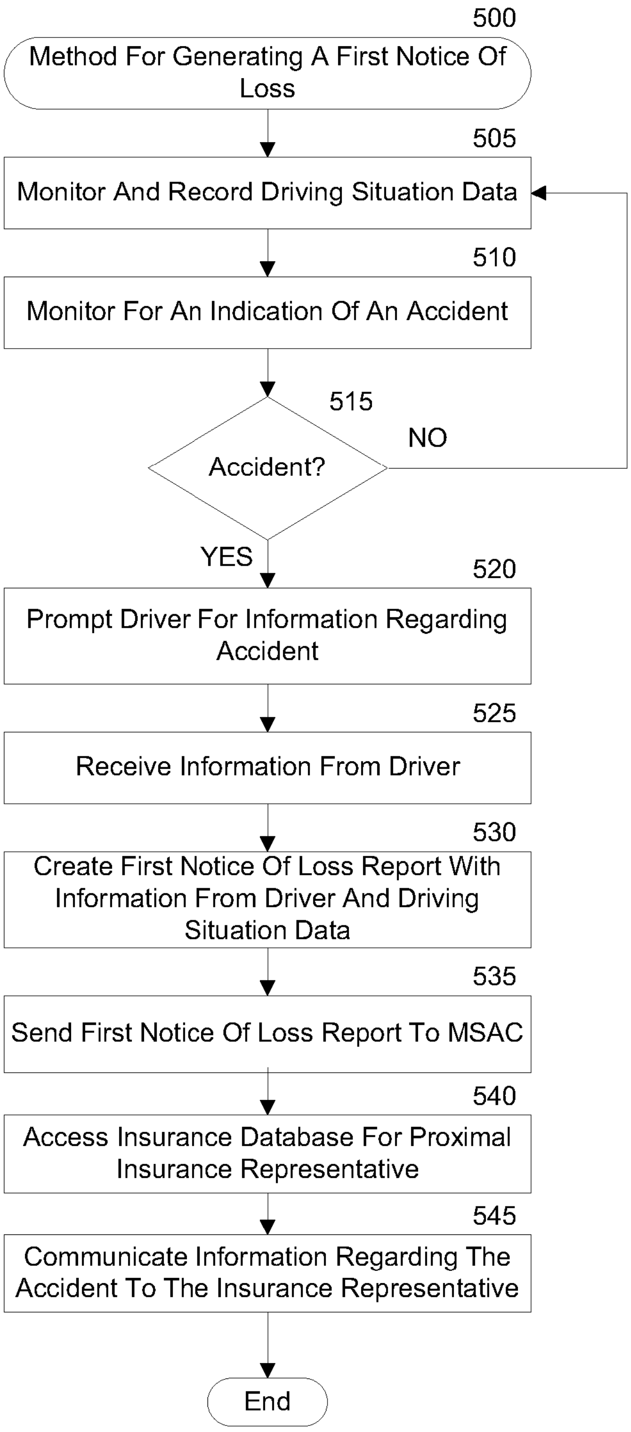
FIG. 5 is a flow chart illustrating a method for recording an accident event and generating a first notice of loss in accordance with certain exemplary embodiments.

FIG. 5 is a flow chart illustrating a method 500 for recording an accident event and generating a first notice of loss in accordance with certain exemplary embodiments. Referring to FIGS. 1 and 5, in step 505, the mobile safety center 111 monitors driving situation data related to the vehicle 103 and records this driving situation data in memory 114 at the mobile device 110. As described above with reference to FIG. 1, the driving situation data that the mobile safety center 111 can collect includes speed, geographic location, acceleration, deceleration, and lateral movement of the vehicle 103. This driving situation data can also include following distance between the vehicle 103 and another vehicle, whether the vehicle 103 is navigating a turn in the road, starts and stops, engine operations, transmission operations, use of accelerators, brakes, turn signals and information provided by safety devices, such as ABS, roll stability, and air bag systems.

In step 510, the mobile safety center 111 monitors for an indication that the vehicle 103 has been involved in an accident. In certain exemplary embodiments, the mobile safety center 111 can provide a user interface for the driver to indicate that an accident has occurred. For example, the user interface may include a link or button that can be selected by the driver. In certain exemplary embodiments, the mobile safety center 111 can use information provided by the vehicle system 130 to determine that the vehicle 103 has been in an accident. For example, if the air bags of the vehicle 103 have deployed, the mobile safety center 111 can determine that the vehicle 103 was in an accident. Additionally, rapid deceleration or a failure of certain vehicle systems may indicate that an accident has occurred. If the mobile safety center 111 detects that an accident has occurred in step 515, the method 500 proceeds to step 520. Otherwise, the method returns to step 505. Although steps 510 and 515 are illustrated as occurring after step 505, step 505 can execute continuously in parallel with steps 510 and 515.

In step 520, the mobile safety center 111 prompts the driver for information regarding the accident. In certain exemplary embodiments, the mobile safety center 111 can provide a user interface with one or more questions that the driver can answer either by making a selection or by text entry. For example, the mobile safety center 111 may ask if the driver or a passenger is hurt or in need of medical attention. Also, the mobile safety center 111 may inquire about details and severity of the accident, such as a description of the condition of or damage to the vehicle 103 or to any other vehicles involved in the accident, what or who caused the accident, and whether a person from another vehicle is hurt. In certain exemplary embodiments, the mobile safety center 111 may prompt the driver to take pictures of the accident scene using the camera 124. For example, the mobile safety center 111 may ask for pictures of the vehicle 103, pictures of other vehicles involved in the accident, and/or pictures of road or traffic conditions. In certain exemplary embodiments, some or all of information that the mobile safety center 111 requests is determined by the driving situation data recorded in step 505. In step 525, the mobile safety center 111 receives the information and stores the information in the memory 114 at the mobile device 110.

In step 530, the mobile safety center 111 creates a first notice of loss report. This first notice of loss report can include the recorded driving situation data and the information received from the driver. In step 535, the mobile safety center 111 sends the first notice of loss to the MSAC 160.

In step 540, the MSAC 160 can access an insurance database (not shown) to find the appropriate insurance provider for the driver or vehicle 103. The MSAC 160 can also determine if there is an insurance representative (e.g., claims adjuster) located proximal to the location of the accident.

In step 545, the MSAC 160 reports the accident to the insurance provider and/or the insurance representative for the provider. The MSAC 160 can include some or all of the information stored in the first notice of loss report received from the mobile safety center 111. The MSAC 160 can also provide other information, such as traffic information 171, weather information 172, and road condition information 173 stored at the MSAC 160 to the insurance provider.

The MSAC 160 can also report the accident and the first notice of loss report to the driver sponsor 155. For example, in a commercial fleet embodiment, the MSAC 160 can report the accident and first notice of loss report to the fleet owner or operator. In another example, the MSAC 160 can report the accident to a parent of a teen driver involved in an accident. The MSAC 160 can store the accident information and first notice of loss reports in the data storage unit 162. Also, the MSAC 160 can compile periodic reports (e.g., daily, monthly, etc.) of all accidents incurred by a fleet of vehicles.

One of ordinary skill in the art would appreciate that the present invention supports systems and methods for identifying risky driving situations in the context of a driver's real-time operating environment and providing effective interventions and countermeasures that mitigate the risky situation to reduce the likelihood of the driver having a vehicular accident. The system includes mobile safety centers individually installed on driver-assigned smartphones or other mobile devices. The mobile safety centers collect real-time driving data and compute a risk of a driver in a specific situation being involved in an accident and provide mentoring to drivers in a driver risk situation above a risk threshold to reduce the likelihood of an accident. The mobile safety centers communicate with a master safety analytics center that collects data, collects and stores information relating to detected risk situations, creates risk algorithms, creates driving mentoring communications, and communicates the algorithms and communications to the mobile safety centers.

The benefits of the present invention compared to conventional driving safety systems are a significant increase in the accuracy and timeliness of risk detection and a significant reduction in the cost of providing a driving improvement system. The present invention also provides an increase in the number of driver risk situations that can be recognized and identification and refinement of more effective intervention methodology to improve driver performance than is achieved by conventional driving safety systems.

The exemplary methods and steps described in the embodiments presented previously are illustrative, and, in alternative embodiments, certain steps can be performed in a different order, in parallel with one another, omitted entirely, and/or combined between different exemplary methods, and/or certain additional steps can be performed, without departing from the scope and spirit of the invention. Accordingly, such alternative embodiments are included in the invention described herein.

The invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media for execution by a processor, such as a central processing unit via computer readable memory. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A system for managing driver safety, comprising:

a safety analytics computer system for generating at least one risk identification algorithm for determining a risk score indicating a likelihood that a driver will be involved in a vehicular accident based on a situation of a vehicle operated by the driver; and a mobile device in communication with the safety analytics computer system for:

receiving the risk identification algorithm from the safety analytics computer system;

obtaining situational information associated with the situation of the vehicle;

executing the risk identification algorithm using at least the situational information to determine the risk score that the driver will be involved in a vehicular accident; and presenting a driver intervention to the driver if the risk score is above a risk threshold associated with a driver intervention rule, wherein the safety analytics computer system is configured to automatically adjust the risk threshold for each driver intervention rule based on information associated with the driver.

2. The system of claim 1, wherein the mobile device is a smartphone.

3. The system of claim 1, wherein the safety analytics computer system generates a driver intervention rule for each of a plurality of vehicle risk situations, each driver intervention rule comprising at least one risk threshold and a driver intervention for presentation to the driver if the risk score exceeds the risk threshold.

4. The system of claim 1, wherein the situational information comprises at least one of information associated with the vehicle, or information associated with weather in a location of the vehicle, or information associated with the traffic density on a roadway that the vehicle is traveling.

5. The system of claim 1, wherein the driver intervention comprises a graphical display presented on a display of the mobile device.

6. The system of claim 1, wherein the driver intervention comprises an audio message delivered by an audio system of the mobile device.

7. The system of claim 1, wherein the mobile device comprises a vehicle interface for communicating with one or more systems of the vehicle.

8. The system of claim 7, wherein at least a portion of the situational information is obtained from the one or more systems of the vehicle.

9. The system of claim 1 wherein the driver intervention comprises a mentoring message presented to the driver by one of an audio system of the vehicle and a display system of the vehicle.

10. The system of claim 1, wherein the mobile device comprises a GPS receiver and the situational information comprises at least one of a speed or a location of the vehicle obtained from the GPS receiver.

11. The system of claim 1, wherein the mobile device comprises an accelerometer and a gyroscope and the situational information comprises information associated with acceleration of the vehicle, deceleration of the vehicle, and whether the vehicle is navigating a turn in a road obtained from the accelerometer and gyroscope.

12. The system of claim 1, wherein the mobile device comprises a camera and the situational information comprises at least one of a following distance of the vehicle relative to another vehicle or driver lane departure information.

13. A method for communicating a driver intervention to a driver to alert the driver of a driving risk, comprising:
- running a mobile safety center module on a smartphone;
- retrieving by the mobile safety center module information associated with a current driving situation for the driver;
- executing on the mobile safety center module a risk identification algorithm using at least the current driving situation information to determine a risk score that indicates a likelihood that the current driving situation corresponds to one of a plurality of driving risks, wherein the risk identification algorithm is received from and generated by a remote safety analytics computer system;
- presenting by the mobile safety center module a driver intervention indicative of the one driving risk to the driver based on the risk score; and
- automatically adjusting the risk threshold based on information associated with the driver.

14. The method of claim 13, wherein the current driving situation information comprises at least one of information associated with a vehicle that the driver is driving, or information associated with a road that the driver is located, or information associated with weather proximal to the driver.

15. The method of claim 13, further comprising the steps of:
- comparing by the mobile safety center module each risk score to at least one risk threshold of an intervention rule corresponding to the driving risk for the risk score; and
- determining by the mobile safety center module the driver intervention to present to the driver based on the comparison.

16. The method of claim 13, wherein the driver intervention is presented to the driver by way of one of an audio system of a vehicle that the driver is driving and a display system of the vehicle that the driver is driving.

17. A computer system for managing driver safety, comprising:
- a risk detection subsystem for generating risk identification algorithms that identify whether a driver of a vehicle is in one of a plurality of driving risk situations, wherein the risk identification algorithms are transmitted to a mobile device for executing the risk identification algorithms using at least information associated with a driving situation to determine a risk score that indicates a likelihood that the driver will be involved in at least a portion of the driving risk situations;
- an intervention rules generator for generating an intervention rule for each of the plurality of driving risk situations, each intervention rule comprising a risk threshold and a driving intervention associated with the risk threshold for presentation to a driver if the risk score for the driver exceeds the risk threshold, wherein the intervention rules generator is operable to automatically adjust the risk threshold based on information associated with the driver;
- a driver intervention subsystem for generating the driving interventions for the intervention rules such that the driver interventions are based on risk threshold information associated with the driver; and
- a communications manager for communicating with one or more information sources to obtain driving situational information and for communicating with a plurality of mobile devices associated with drivers to deliver the risk identification algorithms, intervention rules, and driving interventions to the mobile devices.

18. The system of claim 17, further comprising a safety plan compiler subsystem for aggregating the risk identification algorithms, intervention rules, and driving interventions into a safety plan for a driver.

19. The system of claim 17, further comprising an effectiveness measurement subsystem for evaluating the risk identification algorithms, intervention rules, and driving interventions based on success of reducing driver unsafe behaviors and updating the risk identification algorithms, intervention rules, and driving interventions based on the evaluation.

20. The system of claim 17, wherein the intervention rules generator is operable to adjust the risk thresholds based the likelihood that the driver will be involved in an accident.

21. The system of claim 17, wherein the mobile device comprises a smartphone.

22. The system of claim 17, further comprising a database for storing a report comprising information associated with an occurrence of one of the plurality of driving risk situations received by the communications manager from one of the plurality of mobile devices.

23. The system of claim 22, wherein the communications manager receives information associated with the driving situation of the driver and wherein the risk detection subsystem determines whether the driver is one of the plurality of driving risk situations and responsive to a determination that the driver is in one of the plurality of driving risk situations, storing information associated with the determined driving risk situation in the database.

24. The system of claim 23, wherein the risk detection subsystem uses information stored in the database to improve the accuracy of the risk detection algorithms.

25. The system of claim 17, wherein the communications manager receives updated driving situational information from the information sources and sends the updated driving situational information to one of the mobile devices based on a determination that a potential driving risk situation is present for a driver associated with the mobile device.

26. A smartphone for communicating a driver intervention to a driver to alert the driver of a driving risk, comprising:

a processor, computer-readable memory, and a computer-readable storage media;

a mobile safety center module comprising:

first computer program instructions for obtaining information associated with a current driving situation for the driver;

second computer program instructions for executing one or more risk identification algorithms using at least the current driving situation information to determine a risk score that indicates a likelihood that the current driving situation corresponds to one of a plurality of driving risks, wherein the one or more risk identification algorithms are received from and generated by a remote safety analytics computer system; and third computer program instructions for presenting a driver intervention indicative of the one driving risk to the driver if the risk score satisfies a risk threshold, wherein the mobile safety center module comprises computer-readable instructions stored on the computer-readable storage media for execution by the processor by way of the computer-readable memory, and wherein the risk threshold is automatically adjustable based on information associated with the driver.

27. The smartphone of claim 26, further comprising a display and an audio system and wherein the driver intervention comprises a mentoring message presented to the driver by way of one of the display and the audio system.

28. The smartphone of claim 26, wherein the mobile safety center module further comprises:

fourth computer program instructions to compare the risk score to the risk threshold of an intervention rule corresponding to the driving risk for the risk score; and fifth computer program instructions to determine the driver intervention to present to the driver based upon the comparison.

29. The smartphone of claim 28, wherein the fifth computer program instructions to compare each risk score to the risk threshold of the intervention rule further comprises:

seventh computer program instructions to compare the risk score to a sponsor notification risk threshold of the intervention rule corresponding to the driving risk for the risk score; and eighth computer program instructions for transmitting a message to a driver sponsor of the driver indicative of the driving risk.

30. The smartphone of claim 26, wherein the driving situation information comprises at least one of information associated with a vehicle that the driver is driving, or information associated with weather in a location of the vehicle, or information associated with the traffic density on a roadway that the vehicle is traveling.

31. The smartphone of claim 26, further comprising a vehicle interface for communicating with one or more systems of a vehicle that the driver is driving.

32. The smartphone of claim 31, wherein at least a portion of the driving situation information is obtained from the one or more systems of the vehicle.

33. The smartphone of claim 31, wherein the driver intervention comprises a mentoring message presented to the driver by one of an audio system of the vehicle and a display system of the vehicle.

34. The smartphone of claim 26, further comprising a GPS receiver and the driving situation information comprises at least one of a speed or a location of a vehicle that the driver is driving.

35. The smartphone of claim 26, further comprising an accelerometer and a gyroscope and the driving situation information comprises information associated with acceleration of a vehicle that the driver is driving, deceleration of the vehicle, and whether the vehicle is navigating a turn in a road obtained from the accelerometer and gyroscope.

36. The smartphone of claim 26, further comprising a communications module for communicating with a safety analytics center to obtain a driver safety plan for the driver, the driver safety plan comprising the one or more risk identification algorithms for use by the mobile safety center to determine whether the current driving situation corresponds to one of a plurality of driving risks and one or more driver interventions for presenting to the driver if the current driving situation corresponds to a driving risk.

37. The smartphone of claim 26, further comprising a communications module for communicating with a safety analytics center to obtain at least a portion of the driving situation information.

38. The smartphone of claim 37, wherein the portion of driving situation information comprises at least one of information associated with weather in a location of a vehicle the driver is driving, or information associated with the traffic density on a roadway that the vehicle is traveling, or information associated with weather proximal to the driver.

39. The smartphone of claim 26, wherein the mobile safety center module further comprises:

fourth computer program instructions to determine if a vehicle that the smartphone is located is in motion; and fifth computer program instructions to deactivate voice, text messaging, and email communications capabilities in response to a determination that the vehicle is in motion.

40. A method for generating a first notice of loss, comprising:

running a mobile safety center module on a mobile device associated with a driver;

monitoring and recording by the mobile safety center module information associated with driving situations for the driver;

detecting by the mobile safety center module that a vehicular accident has occurred involving a vehicle associated with the driver;

receiving from the mobile safety center module information regarding the vehicular accident through a user interface for the mobile device; and issuing by the mobile safety center module a first notice of loss comprising an indication of the vehicular accident and the information regarding the vehicular accident received through the user interface to a master safety analytics center, wherein information regarding the vehicular accident includes an automatically adjustable risk threshold associated with the driver.

41. The method of claim 40, wherein the mobile device comprises a smartphone.

42. The method of claim 40, wherein the information regarding the accident includes at least one of information regarding injuries, or information regarding location of the vehicle, or information regarding condition of the vehicle, or information regarding other vehicles involved in the vehicular accident, or pictures relating to the vehicular accident.

43. The method of claim 42, wherein the pictures relating to the vehicular accident comprise at least one of a picture of the vehicle, or a picture of other vehicles involved in the vehicular accident, or a picture of a road the vehicle was riding.

44. The method of claim 40, wherein the step of detecting that a vehicular accident has occurred comprises the driver providing an indication to the mobile device that the vehicular accident has occurred.

45. The method of claim 40, wherein the step of detecting that a vehicular accident has occurred comprises the mobile safety center module receiving information from a vehicle system indicating that the vehicle accident has occurred.

46. The method of claim 45, wherein the vehicle system comprises a vehicular air bag system.

47. The method of claim 45, wherein the information associated with driving situations comprises at least one of a speed of the vehicle, or information associated with an acceleration of the vehicle, or whether the vehicle is turning, or a following distance of the vehicle in relation to another vehicle.

48. The method of claim 40, further comprising the step of the master safety analytics center sending the first notice of loss to an insurance entity associated with the driver.

49. The system of claim 1, wherein the risk score is further determined based on road characteristic information including elevation.

50. The method of claim 13, wherein the risk score is further determined based on road characteristic information including elevation.

51. The computer system of claim 17, wherein the risk score is further determined based on road characteristic information including elevation.

* * * * *